(12) United States Patent
Lee et al.

(10) Patent No.: US 11,392,157 B2
(45) Date of Patent: Jul. 19, 2022

(54) AUXILIARY APPARATUS FOR CONTROLLING MODE OF DC-DC CONVERTER

(71) Applicant: HYUNDAI MOBIS CO., LTD., Seoul (KR)

(72) Inventors: Keon Lee, Gwangju-si (KR); Na-Yeon Kim, Seoul (KR); Doo-Jin Jang, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/085,794

(22) Filed: Oct. 30, 2020

(65) Prior Publication Data

US 2021/0135560 A1 May 6, 2021

(30) Foreign Application Priority Data

Nov. 5, 2019 (KR) .......................... 10-2019-0140144

(51) Int. Cl.
*G05F 3/26* (2006.01)
*H02M 1/00* (2006.01)
*H02M 3/156* (2006.01)
*H02M 3/158* (2006.01)

(52) U.S. Cl.
CPC .......... *G05F 3/262* (2013.01); *H02M 1/0025* (2021.05); *H02M 3/1566* (2021.05); *H02M 3/158* (2013.01)

(58) Field of Classification Search
CPC ..... G05F 3/262; H02M 3/1566; H02M 1/0003; H02M 1/0025
See application file for complete search history.

(56) References Cited

U.S. PATENT DOCUMENTS

| | | | |
|---|---|---|---|
| 2017/0070149 A1* | 3/2017 | Guan | H02M 1/32 |
| 2017/0315578 A1* | 11/2017 | Lin | G05F 3/262 |
| 2019/0011944 A1* | 1/2019 | Ono | G05F 1/565 |
| 2021/0083583 A1* | 3/2021 | Becker | G05F 3/262 |

FOREIGN PATENT DOCUMENTS

KR 10-2017-0098033 A 8/2017

\* cited by examiner

*Primary Examiner* — Alex Torres-Rivera
(74) *Attorney, Agent, or Firm* — Morgan, Lewis & Bockius LLP

(57) ABSTRACT

Disclosed is an auxiliary apparatus for controlling a current mode of a DC-DC converter. The auxiliary apparatus includes a current mirror coupled to a source voltage and configured to duplicate and supply a reference current supplied from a constant current source, an amplification unit configured to perform negative feedback on a loop control voltage, generated from a DC-DC converter current mode driving unit, and a reference voltage, generated based on the reference current supplied from the current mirror, and a control voltage clamping unit configured to limit a reduction in the loop control voltage based on a gate control voltage output based on a result of the comparison and amplification of the amplification unit.

9 Claims, 2 Drawing Sheets

AUXILIARY APPARATUS FOR CONTROLLING MODE OF DC-DC CONVERTER

CROSS-REFERENCE TO RELATED APPLICATION

This application claims priority from and the benefit of Korean Patent Application No. 10-2019-0140144, filed on Nov. 5, 2019, which is hereby incorporated by reference for all purposes as if set forth herein.

BACKGROUND

Field

Exemplary embodiments of the present disclosure relate to an auxiliary control apparatus for improving a transient response characteristic of a current mode of a DC-DC converter, and more particularly, to an auxiliary apparatus for controlling a current mode of a DC-DC converter, which improves a transient response characteristic between the stop of a driving loop of the DC-DC converter and the return of the driving loop by controlling a gate voltage of a pull-up transistor for clamping based on a voltage difference between an output voltage of an error amplifier within the DC-DC converter and a reference voltage.

Discussion of the Background

As the micro-processing of an MCU is accelerated, an operation speed and dynamic current consumption of the MCU have increased. Accordingly, a transient response characteristic of an MCU power source unit becomes important.

A method of controlling a current mode of a DC-DC converter is frequently applied as a method of controlling an output voltage for MCU power due to its excellent line regulation and load regulation characteristics. In order to control a current mode, an error signal of a feedback voltage needs to be changed into a current signal. The error signal of the feedback voltage generated by an error amplifier is changed into the current signal through a voltage-current conversion circuit. A current comparator generates a pulse width modulation (PWM) signal by comparing the changed current signal with a current signal flowing into an inductor.

In the case of the DC-DC converter, compared to an input voltage, an output voltage is determined based on a duty ratio of the PWM signal. When the output voltage is lower than a target voltage, the duty ratio of the PWM signal is increased because the error signal of the error amplifier is increased, so the output voltage is increased. In contrast, when the output voltage is higher than the target voltage, the duty ratio of the PWM signal is also decreased because the error signal of the error amplifier is decreased, so the output voltage is decreased. A major object of an MCU power source unit is to enable such a negative feedback loop to operate rapidly and stably.

The Background Technology of the present disclosure is disclosed in Korean Patent Application Publication No. 10-2017-0098033 (Aug. 29, 2017) entitled "Quasi-current-mode Hysteretic Control Method for Switching DC-DC Converter, Quasi Inductor Current Emulator for Switching DC-DC Converter and Hysteretic Converter using thereof."

SUMMARY

Conventionally, if a driving loop is stopped due to a sharp decrease in a load current of an MCU power source unit and then the load current is increased again, an excessive under-drop occurs in an output voltage because the driving loop does not rapidly return. While the driving loop is stopped, the output voltage of an error amplifier is decreased to a valid area (0.5 V to 2.5 V) or less and converges on the ground. Thereafter, in order for the driving loop to operate normally again, a delay time occurs until the output voltage of the error amplifier returns to the valid area from a ground voltage. During the delay time, the driving loop does not generate a proper PWM signal, thereby causing an unexpected under-drop in the output voltage.

Various embodiments are directed to providing an auxiliary apparatus for controlling a current mode of a DC-DC converter, which improves a transient response characteristic between the stop of the driving loop of the DC-DC converter and the return of the driving loop by controlling a gate voltage of a pull-up transistor for clamping based on a voltage difference between an output voltage of an error amplifier within the DC-DC converter and a reference voltage.

An auxiliary apparatus for controlling a current mode of a DC-DC converter according to an aspect of the present disclosure includes a current mirror coupled to a source voltage and configured to duplicate and supply a reference current supplied from a constant current source, an amplification unit configured to perform negative feedback on a loop control voltage, generated from a DC-DC converter current mode driving unit, and a reference voltage, generated based on the reference current supplied from the current mirror, and a control voltage clamping unit configured to adjust the loop control voltage based on a gate control voltage output based on a result of the negative feedback of the amplification unit.

In an embodiment, the amplification unit includes an amplifier configured to receive the reference voltage through an inverting terminal thereof, receive the loop control voltage through a non-inverting terminal thereof, and output the gate control voltage by comparing and amplifying the reference voltage and a clamping voltage, and a first NMOS transistor having a drain coupled to the current mirror, a source coupled to a ground through a first resistor, and a gate coupled to an inverting terminal of a comparator and configured to apply the reference voltage to the comparator, wherein the drain and the gate are coupled in common.

In an embodiment, the control voltage clamping unit is controlled by the gate control voltage and does not affect the loop control voltage or prevents a decrease in the loop control voltage.

In an embodiment, the control voltage clamping unit does not affect the loop control voltage when the gate control voltage is increased.

In an embodiment, the control voltage clamping unit allows the loop control voltage to converge on the reference voltage, when the gate control voltage is decreased.

In an embodiment, the control voltage clamping unit includes a first PMOS transistor having a source coupled to the source voltage, a gate coupled to an output stage of the amplification unit, and a drain coupled to a loop control voltage node of the error amplifier, turned off when the gate control voltage is increased, and turned on when the gate control voltage is decreased.

In an embodiment, the auxiliary apparatus further includes a state output unit configured to output a state of the loop control voltage to the DC-DC converter current mode driving unit.

In an embodiment, the state output unit includes a second NMOS transistor having a drain coupled to the current mirror, a gate coupled to a loop control voltage node, and a source coupled to a ground through a second resistor and turned on in response to the loop control voltage, and a common source amplification unit configured to output a state of the loop control voltage as a voltage signal when the second NMOS transistor is turned on.

In an embodiment, the common source amplification unit includes a third NMOS transistor having a drain coupled to the current mirror, a source coupled to the ground, and a gate coupled between the drain of the second NMOS transistor and the current mirror and configured to amplify a signal according to a turn-off of the second NMOS transistor by a decrease in a drain voltage thereof when the drain voltage of the second NMOS transistor is increased by the turn-off of the second NMOS transistor, and an inverter having one end coupled between the drain of the third NMOS transistor and the current mirror and the other end coupled to the DC-DC converter current mode driving unit and configured to convert, into a digital signal, the signal amplified by the third NMOS transistor and output a soft over-voltage digital signal.

DETAILED DESCRIPTION OF THE ILLUSTRATED EMBODIMENTS

Figure 1:
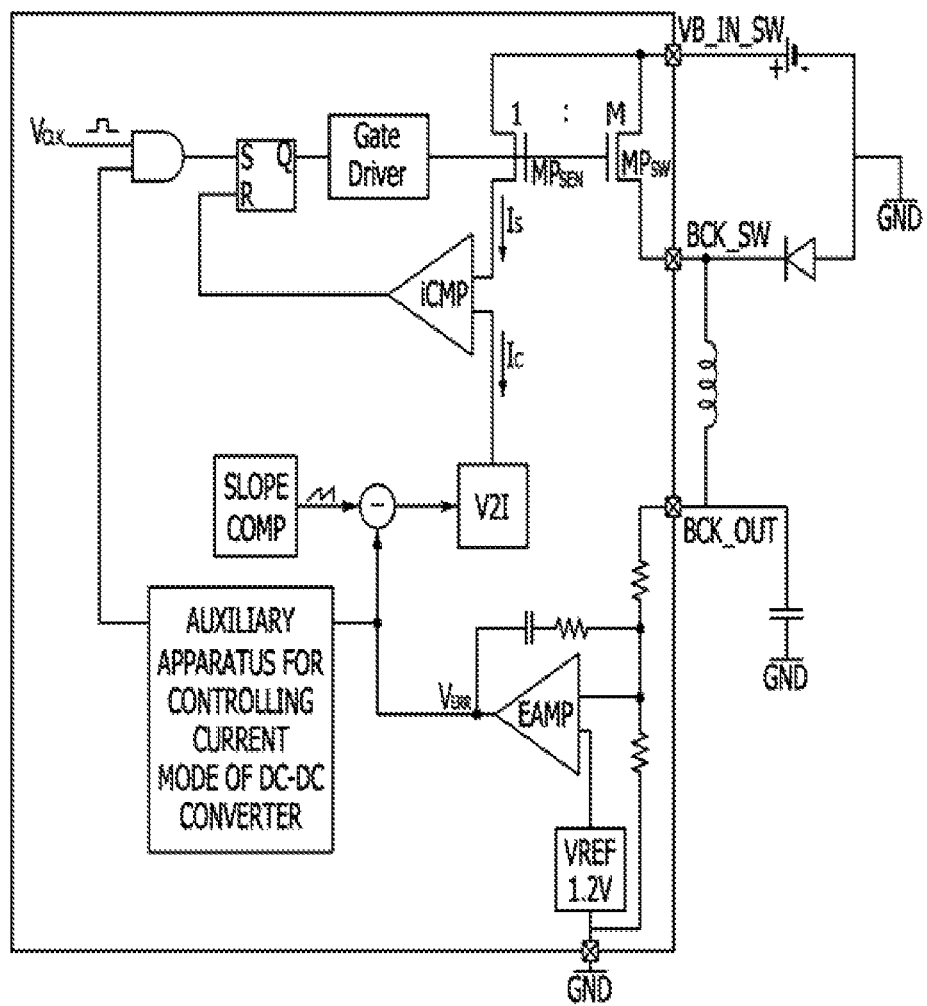
FIG. 1 is a block diagram of a DC-DC converter current mode driving unit according to an embodiment of the present disclosure.

Hereinafter, an auxiliary apparatus for controlling a current mode of a DC-DC converter will be described below in detail with reference to the accompanying drawings through various exemplary embodiments. The thicknesses of lines or the sizes of elements shown in the drawings in a process of describing this specification may have been exaggerated for the clarity of a description and for convenience' sake. Terms to be described below have been defined by taking into consideration their functions in the present disclosure, and may be changed depending on a user or operator's intention or practice. Accordingly, such terms should be defined based on the overall contents of this specification.

An implementation described in this specification may be realized as a method or process, apparatus, software program, data stream or signal, for example. Although the present disclosure has been discussed only in the context of a single form of an implementation (e.g., discussed as only a method), an implementation having a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device which facilitates the communication of information between end-users.

FIG. 1 is a block diagram of a DC-DC converter current mode driving unit according to an embodiment of the present disclosure.

An apparatus for controlling a current mode of a DC-DC converter according to an embodiment of the present disclosure may be applied to the DC-DC converter current mode driving unit illustrated in FIG. 1.

Referring to FIG. 1, in the DC-DC converter current mode driving unit, when a current switch $MP_{SW}$ (high side switch) is switched by a pulse width modulation (PWM) signal, a current flowing into an inductor is controlled, so a buck output (BCK_OUT) is formed.

A current sensor $MP_{SEN}$ and the current switch $MP_{SW}$ are designed to have a current ratio of m:1. A detection current (Is) scaled down to a current of 1/m of the current switch $MP_{SW}$ flows through the current sensor $MP_{SEN}$.

The buck output (BCK_OUT) is scaled down to a reference voltage (VREF), that is, 1.2 V, by resistance heat. The reference voltage and the scaled-down buck output (BCK_OUT) are input to an error amplifier EAMP.

The error amplifier EAMP outputs an error voltage ($V_{ERR}$) by comparing the buck output (BCK_OUT) with the reference voltage.

The error voltage ($V_{ERR}$) is combined with a chopping wave output from a slope compensator SLOPE COMP. In this case, the error voltage ($V_{ERR}$) may be subtracted by the chopping wave output from the slope compensator SLOPE COMP.

A voltage obtained by subtracting the error voltage ($V_{ERR}$) by the chopping wave is converted into a current by a voltage current converter V2I. Such a current is a control current ($I_C$).

A signal level of a gate driver becomes high by a clock ($V_{clk}$). At this time, the detection current (Is) scaled down to the current of 1/m of the current switch $MP_{SW}$ is input to a current comparator iCMP.

The current comparator iCMP compares the scaled-down detection current (Is) and the control current ($I_C$). When the scaled-down detection current (Is) is higher than the control current ($I_C$) converted by the voltage current converter V2I, the output of the current comparator becomes high, resetting high an RS latch. A duty ratio of a PWM signal is determined by a low level signal applied to the gate driver.

In this process, if a driving loop is stopped due to a sharp decrease in the current of the buck output (BCK_OUT) and then the load current is increased again, an excessive under-drop occurs in the output voltage because the driving loop does not rapidly return. While the driving loop is stopped, the output voltage of the error amplifier EAMP is decreased to a valid area (0.5 V to 2.5 V) or less and converges on a ground GND. Thereafter, in order for the driving loop to operate normally again, a delay time occurs until the output voltage of the error amplifier EAMP returns to the valid area from a ground voltage. During the delay time, the driving loop does not operate normally, thereby causing an unexpected under-drop in the output voltage.

Accordingly, the auxiliary apparatus for controlling a current mode of the DC-DC converter according to an embodiment of the present disclosure is coupled to a VERR node within the DC-DC converter current mode driving unit as illustrated in FIG. 1, and improves a transient response characteristic between the stop of the driving loop of the DC-DC converter and the return of the driving loop by comparing a loop control voltage (Vc) of the VERR node with a preset reference voltage and controlling a gate voltage of a pull-up transistor for clamping based on a voltage difference between both ends. This is described in detail with reference to FIG. 2.

Figure 2:
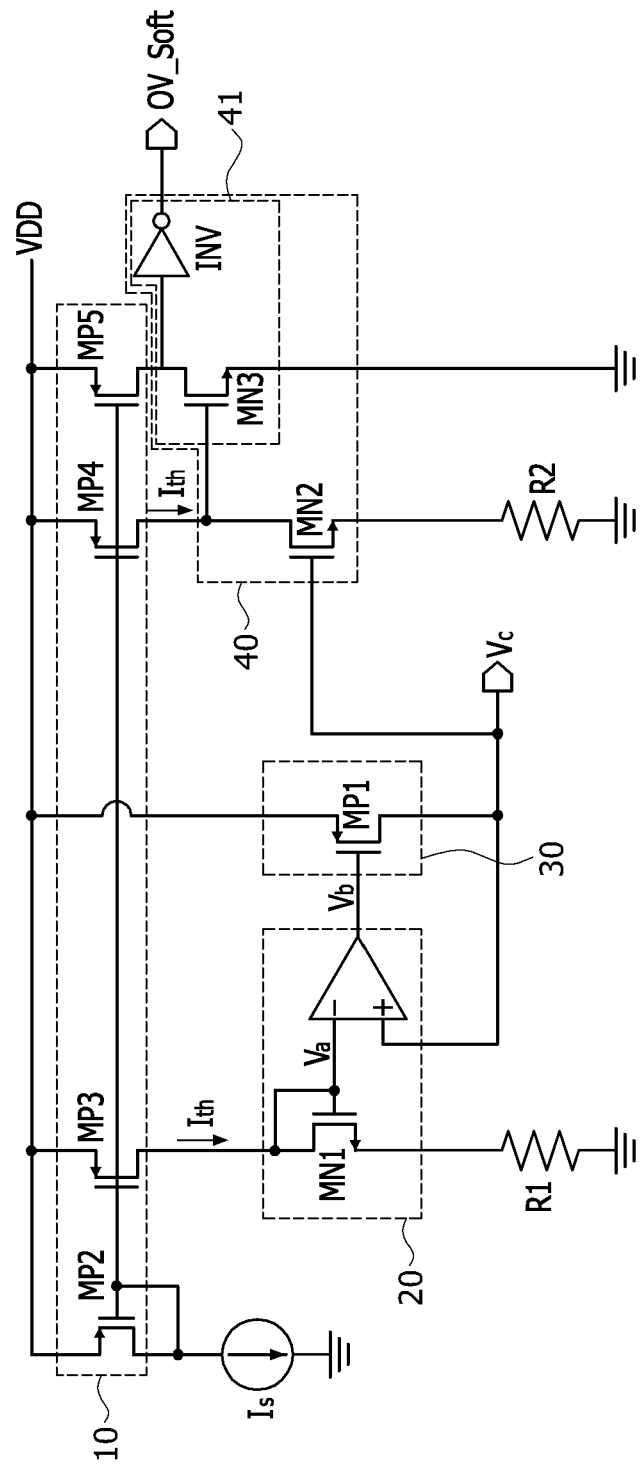
FIG. 2 is a circuit diagram of an auxiliary apparatus for controlling a current mode of a DC-DC converter according to an embodiment of the present disclosure.

FIG. 2 is a circuit diagram of an auxiliary apparatus for controlling a current mode of a DC-DC converter according to an embodiment of the present disclosure.

Referring to FIG. 2, the auxiliary apparatus for controlling a current mode of a DC-DC converter according to an embodiment of the present disclosure includes a current mirror 10, an amplification unit 20, a control voltage clamping unit 30, and a state output unit 40.

The current mirror 10 is coupled to a source voltage (VDD) and duplicates and supplies a reference current ($I_{th}$) supplied from a constant current source Is.

The current mirror 10 includes the constant current source Is, a second PMOS transistor MP2 coupled in series to the constant current source Is, and a third PMOS transistor MP3 to a fifth PMOS transistor MP5 coupled in parallel to the second PMOS transistor MP2.

The second PMOS transistor MP2 has a drain coupled in series to the constant current source Is, a source coupled to the source voltage (VDD), and a gate coupled to the drain to form a diode connection.

The third PMOS transistor MP3 has a gate coupled to the gate of the second PMOS transistor MP2, a source coupled to the source voltage (VDD), and a drain coupled to a drain of a first NMOS transistor MN1 of the amplification unit 20 to be described later.

The fourth PMOS transistor MP4 has a gate coupled to the gate of the second PMOS transistor MP2, a source coupled to the source voltage (VDD), and a drain coupled to a drain of a second NMOS transistor MN2 within the state output unit 40 to be described later.

The fifth PMOS transistor MP5 has a gate coupled to the gate of the second PMOS transistor MP2, a source coupled to the source voltage (VDD), and a drain coupled to a drain of a third NMOS transistor MN3 within the state output unit 40 to be described later.

Each of the third PMOS transistor MP3 to the fifth PMOS transistor MP5 is designed to have the same size as the second PMOS transistor. The same current as the current flowing through the second PMOS transistor MP2 flows through the third PMOS transistor MP3 to the fifth PMOS transistor MP5.

That is, each of the second PMOS transistor MP2 to the fifth PMOS transistor MP5 is coupled to a constant current source Vs to form the current mirror 10 having the same size and ability, and supplies the same current through the current mirror.

The amplification unit 20 compares the error voltage (VERB) generated from the DC-DC converter current mode driving unit illustrated in FIG. 1, that is, the loop control voltage ($V_c$), with a reference voltage generated based on the reference current ($I_{th}$) supplied from the current mirror 10. In this case, the loop control voltage ($V_c$) is the same as the error voltage of the DC-DC converter current mode driving unit.

The amplification unit 20 includes an amplifier AMP and the first NMOS transistor MN1.

The first NMOS transistor MN1 has the drain coupled to the drain of the third PMOS transistor within the current mirror 10, a drain coupled to a ground through a first resistor R1, and a gate coupled to an inverting terminal (−) of the amplifier AMP. The drain and gate of the first NMOS transistor MN1 are coupled in common.

When supplied with the reference current ($I_{th}$) from the third PMOS transistor MP3, the first NMOS transistor MN1 forms a reference voltage ($V_a$) (drain voltage) and applies the reference voltage ($V_a$) to the inverting terminal (−) of the amplifier AMP.

The amplifier AMP receives the reference voltage ($V_a$) through the inverting terminal (−) thereof, receives the loop control voltage ($V_c$) through a non-inverting terminal (+) thereof, amplifies a difference between the reference voltage ($V_a$) and the loop control voltage ($V_c$), and applies a gate control voltage ($V_b$) to the control voltage clamping unit 30.

In this case, the amplifier AMP increases the gate control voltage ($V_b$) when the loop control voltage ($V_c$) is higher than the reference voltage ($V_a$), and decreases the gate control voltage ($V_b$) when the reference voltage ($V_a$) is higher than the loop control voltage ($V_c$).

The control voltage clamping unit 30 limits the loop control voltage ($V_c$) based on the gate control voltage ($V_b$) output based on the results of the amplification of the amplification unit 20.

The control voltage clamping unit 30 may be a first PMOS transistor MP1.

The first PMOS transistor MP1 has a source coupled to the source voltage (VDD), a gate coupled to the output stage of the amplifier AMP, and a drain coupled to the output node of an error amplifier, that is, the loop control voltage ($V_c$).

Accordingly, the first PMOS transistor MP1 is turned off when the gate control voltage ($V_b$) input from the output stage of the amplifier AMP to the gate of the first PMOS transistor MP1 is increased, and is turned on when the gate control voltage ($V_b$) input from the output stage of the amplifier AMP to the gate of the first PMOS transistor MP1 is decreased.

If the gate control voltage ($V_b$) is increased and thus the first PMOS transistor MP1 is turned off, the loop control voltage ($V_c$) is not affected by the proposed auxiliary apparatus.

In contrast, if the gate control voltage ($V_b$) is decreased and thus the first PMOS transistor MP1 is turned on, the loop control voltage ($V_c$) no longer decreases and converges on the reference voltage ($V_a$).

That is, the loop control voltage ($V_c$) does not decrease to 0 V, and is clamped to the reference voltage ($V_a$).

As described above, as the loop control voltage ($V_c$) waits as the reference voltage ($V_a$), the driving loop can rapidly return although a driving loop is stopped due to a sharp decrease in a load current of the DC-DC converter current mode driving unit and then the load current is increased again. Accordingly, the occurrence of an excessive under-drop in the DC-DC converter current mode driving unit can be minimized, and thus loop control can be immediately performed without a delay time.

The state output unit 40 outputs a state of the loop control voltage ($V_c$) to the DC-DC converter current mode driving unit.

The state output unit 40 includes the second NMOS transistor MN2 and a common source amplification unit 41.

The second NMOS transistor MN2 has the drain coupled to the drain of the fourth PMOS transistor MP4 within the current mirror 10, a gate coupled to a loop control voltage node, and a source coupled to the ground through a second resistor R2. The second NMOS transistor MN2 is turned on or off in response to the loop control voltage ($V_c$).

As described above, the reference current ($I_{th}$) is applied to the second NMOS transistor MN2 through the drain of the fourth PMOS transistor MP4 within the current mirror 10. In this case, if the current of the fourth PMOS transistor is higher than a current to be driven by the second NMOS transistor MN2, the drain voltage of the second NMOS transistor is increased. A signal according to the increased drain voltage is input to a gate of the third NMOS transistor MN3 within the common source amplification unit 41 to be described later.

The common source amplification unit 41 outputs a state of the loop control voltage ($V_c$) as a voltage signal when the third NMOS transistor MN3 is turned on.

The common source amplification unit 41 includes the third NMOS transistor MN3 and an inverter INV.

The third NMOS transistor MN3 has the drain coupled to the drain of the fifth PMOS transistor MP5 within the current mirror 10, a source coupled to the ground, and the gate coupled between the drain of the second NMOS transistor MN2 and the drain of the fifth PMOS transistor MP5.

When a drain voltage of the second NMOS transistor MN2 is increased due to a decrease in a gate voltage of the second NMOS transistor MN2, a drain voltage of the third NMOS transistor MN3 is decreased depending on a voltage input to the gate of the third NMOS transistor MN3. A signal according to the drain voltage increased by the turn-off of the second NMOS transistor MN2 is primarily amplified.

The inverter INV has one end coupled between the drain of the third NMOS transistor MN3 and the drain of the fifth PMOS transistor MP5 within the current mirror 10, and has the other end coupled to an AND gate within the DC-DC converter current mode driving unit. The inverter INV converts a signal amplified by the third NMOS transistor MN3, and inputs a soft over-voltage digital signal (OV_Soft) of a high signal or a low signal to the AND gate within the DC-DC converter current mode driving unit.

Accordingly, the AND gate within the DC-DC converter current mode driving unit receives the clock ($V_{clk}$) and the soft over-voltage digital signal (OV_Soft), and outputs a signal. The signal output by the AND gate is input to an RS latch, and thus a PWM signal is output as described above.

The first resistor R1 is coupled between the source of the first NMOS transistor MN1 and the ground. The second resistor R2 is coupled between the source of the second NMOS transistor MN2 and the ground. The first resistor R1 and the second resistor R2 are configured to have the same resistance value. Accordingly, the first NMOS transistor MN1 and the second NMOS transistor MN2 may have the same voltage current conversion ratio.

As described above, the auxiliary apparatus for controlling a current mode of a DC-DC converter according to an embodiment of the present disclosure improves a transient response characteristic between the stop of the driving loop of the DC-DC converter and the return of the driving loop by controlling a gate voltage of the pull-up transistor for clamping based on a result of a comparison and amplification for the loop control voltage of the DC-DC converter and a reference voltage.

The auxiliary apparatus for controlling a current mode of a DC-DC converter according to an embodiment of the present disclosure improves a transient response characteristic between the stop of the driving loop of the DC-DC converter and the return of the driving loop by controlling a gate voltage of the pull-up transistor for clamping based on a result of a comparison between a loop control voltage of the DC-DC converter and a reference voltage.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An auxiliary apparatus for controlling a current mode of a DC-DC converter, comprising:
   a current mirror coupled to a source voltage and configured to duplicate and supply a reference current supplied from a constant current source;
   an amplification unit configured to perform negative feedback on a loop control voltage, generated from a DC-DC converter current mode driving unit, and a reference voltage, generated based on the reference current supplied from the current mirror; and
   a control voltage clamping unit configured to adjust the loop control voltage based on a gate control voltage output based on a result of the negative feedback of the amplification unit.

2. The auxiliary apparatus of claim 1, wherein the amplification unit comprises:
   an amplifier configured to receive the reference voltage through an inverting terminal thereof, receive the loop control voltage through a non-inverting terminal thereof, and output the gate control voltage by comparing and amplifying the reference voltage and the loop control voltage; and
   a first NMOS transistor having a drain coupled to the current mirror, a source coupled to a ground through a first resistor, and a gate coupled to an inverting terminal of the amplifier and configured to apply the reference voltage to the amplifier, wherein the drain and the gate are coupled in common.

3. The auxiliary apparatus of claim 1, wherein the control voltage clamping unit is controlled by the gate control voltage and does not affect the loop control voltage or prevents a decrease in the loop control voltage.

4. The auxiliary apparatus of claim 3, wherein the control voltage clamping unit does not affect the loop control voltage when the gate control voltage is increased.

5. The auxiliary apparatus of claim 3, wherein the control voltage clamping unit allows the loop control voltage to converge on the reference voltage, when the gate control voltage is decreased.

6. The auxiliary apparatus of claim 3, wherein the control voltage clamping unit comprises a first PMOS transistor having a source coupled to the source voltage, a gate coupled to an output stage of the amplification unit, and a drain coupled to a loop control voltage node of an error amplifier, turned off when the gate control voltage is increased, and turned on when the gate control voltage is decreased.

7. The auxiliary apparatus of claim 1, further comprising a state output unit configured to output a state of the loop control voltage to the DC-DC converter current mode driving unit.

8. The auxiliary apparatus of claim 7, wherein the state output unit comprises:
   a second NMOS transistor having a drain coupled to the current mirror, a gate coupled to a loop control voltage node, and a source coupled to a ground through a second resistor and turned on in response to the loop control voltage; and
   a common source amplification unit configured to output a state of the loop control voltage as a voltage signal when the second NMOS transistor is turned on.

9. The auxiliary apparatus of claim 8, wherein the common source amplification unit comprises:
   a third NMOS transistor having a drain coupled to the current mirror, a source coupled to the ground, and a gate coupled between the drain of the second NMOS transistor and the current mirror and configured to amplify a signal according to a turn-off of the second NMOS transistor by a decreasing in a drain voltage thereof when the drain voltage of the second NMOS transistor is increased by the turn-off of the second NMOS transistor; and an inverter having one end coupled between the drain of the third NMOS transistor and the current mirror and the other end coupled to the DC-DC converter current mode driving unit and configured to convert, into a digital signal, the signal amplified by third NMOS transistor and output a soft over-voltage digital signal.

\* \* \* \* \*